United States Patent [19]

Nesmeyanov et al.

[11] 4,202,908

[45] May 13, 1980

[54] SYNTHETIC, GRANULAR FOOD CAVIAR AND METHOD OF PREPARING SAME

[75] Inventors: Alexandr N. Nesmeyanov; Sergei V. Rogozhin; Vladimir B. Tolstoguzov; Vladimir I. Misjurev; Vera A. Ershova; Evgeny E. Braudo, all of Moscow, U.S.S.R.

[73] Assignee: Institut Elementoorganicheskih Soedineny, Moscow, U.S.S.R.

[21] Appl. No.: 907,042

[22] Filed: May 17, 1978

Related U.S. Application Data

[63] Continuation of Ser. No. 668,788, Mar. 19, 1976, abandoned, which is a continuation-in-part of Ser. No. 563,202, Mar. 28, 1975, abandoned, and Ser. No. 563,205, Mar. 28, 1975, abandoned.

[51] Int. Cl.² .............................................. A23J 3/00

[52] U.S. Cl. ........................................ 426/72; 426/89; 426/104; 426/250; 426/575; 426/577; 426/656

[58] Field of Search ................... 426/89, 273, 274, 72, 426/573, 104, 575–577, 656, 658, 250, 540

[56] References Cited

U.S. PATENT DOCUMENTS

3,717,469   2/1973   Slonimsky .......................... 426/658

*Primary Examiner*—Jeanette M. Hunter
*Attorney, Agent, or Firm*—Haseltine, Lake & Waters

[57] ABSTRACT

Synthetic granular caviar having a jelled center of gelatin containing additional protein and being surrounded by two coatings; the inner coating being the reaction product of said jelled center with vegetable tannins and the outer coating being the reaction product of a polyvalent metal salt and an acid polysaccharide.

45 Claims, No Drawings

SYNTHETIC, GRANULAR FOOD CAVIAR AND METHOD OF PREPARING SAME

The present invention is a continuation of patent application Ser. No. 668,788, filed Mar. 19, 1976 which, in turn, is a continuation-in-part of application Ser. Nos. 563,202 and 563,205 both filed on Mar. 28, 1975, both now abandoned.

The present invention relates to foodstuffs, and more particularly it relates to synthetic, granular food caviar, imitating caviar of sturgeon, salmon, and other large valuable fish, and to methods for preparing said caviar.

Known in the prior art is synthetic food caviar the granules of which are an aqueous jell of gelatin containing edible proteins and coated in a pellicle consisting of the products of tanning of said gelatin jell with vegetable tannins. Said pellicle contains eno- and annatto edible dyes, or complex salts of tervalent iron and vegetable tannins. Said eno- and annatto dyes give the granule pellicle orange-red colour, while complex salts of tervalent iron give them greyish-black colour. The granular mass of caviar contains various culinary additives, such as vegetable oil, sodium chloride, sodium glutamate, edible aromatic and flavouring substances, etc.

Said synthetic food caviar is prepared by the method as follows: an aqueous solution of food gelatin containing edible proteins is prepared, said solution is introduced in the form of droplets into an edible oil, the temperature of which, at least in its lower layers, is maintained below the temperature at which the droplets of said solution congeal. The shaped granules of gelatin jell containing edible proteins, are washed with water to remove the edible oil, and then are processed with aqueous solutions of vegetable tannins. The resulting granules of synthetic food caviar are then washed with water to remove said vegetable tannins, after which they are treated with aqueous solutions of edible dyes (eno-, annatto dyes, or salts of tervalent iron and edible acids). Further, the caviar granules are given a culinary treatment consisting in salting the granules with sodium chloride and adding to them vegetable oil, flavouring substances, and other valuable materials that improve the nutritive properties of the synthetic caviar.

The thus-prepared synthetic food caviar is insufficiently stable at elevated temperatures since gelatin jell melts at temperatures above 30° C. and the granular structure of caviar is thus lost. This is explained by the fact that in contrast to granules of natural caviar, the pellicle of artificial caviar granule has no mechanical strength. This is the cause of difficulties arising in storage, transportation and using the product at temperatures above 30° C.

Attempts have been made to prepare synthetic food caviar having sufficient thermal stability. The method for preparing this caviar consists in that an aqueous solution of food gelatin containing edible proteins and acid polysaccharides is prepared. Said solution is introduced in the form of droplets into an edible oil the temperature of which, at least in its lower layers, is maintained below the temperature at which the droplets of gelatin jell congeal. The shaped granules of gelatin jell containing edible proteins and acid polysaccharides are washed with water to remove the edible oil and treated with aqueous solutions of salts formed by edible acids and edible polyvalent metals, for example calcium and/or aluminium. As a result of this treatment, a net of ionotropic jell, consisting of salts of edible polyvalent metals (for example, calcium and/or aluminium) and acid polysaccharides is formed. The granules of the mixed jell on the basis of food gelatin and salts of said metals and acid polysaccharides are treated with aqueous solutions of vegetable tannins. The resulting synthetic caviar granules are washed with water to remove said tannins, and treated with aqueous solutions of edible dyes (eno-, annatto dyes, or salts of tervalent iron and edible acids). The synthetic caviar granules are then given a culinary treatment consisting of salting with sodium chloride, and adding vegetable oil, flavouring substances, and other culinary additives.

The thus-prepared synthetic caviar granules are a mixed aqueous jell of food gelatin and salts of said metals (for example, calcium and/or aluminium) and acid polysaccharides, containing edible proteins, and enclosed in a coat consisting of the products of gelatin jell tanned with vegetable tannins. Said pellicle contains edible eno-, annatto dyes, or complex salts of tervalent iron and vegetable tannins. Eno- and annatto dyes give the pellicle a red-orange colour, and the complex salts of ferric iron give a greyish-black colour. The synthetic caviar mass contains various culinary additives: sodium chloride, vegetable oil, edible aromatic and flavouring substances, and other valuable materials that improve the nutritive properties of the synthetic caviar.

This synthetic caviar is quite thermally stable (not less than 50° C.) owing to the presence in the gelatin jell of the net of jell and of salts of acid polysaccharides. But since the salts of acid polysaccharides are non-melting, they substantially impair the organoleptic properties of caviar to make its granules non-melting in the mouth.

The object of this invention is to provide a synthetic, granular food caviar having sufficient thermal stability and preserving the organoleptic properties inherent in natural caviar, including the property of the granule contents being in the liquid state at the temperature of the mouth cavity.

Another object of the invention is to provide a method for preparing a synthetic, granular food caviar having the above-named properties.

In accordance with these and other objects, the invention consists in that proposed is a synthetic food caviar the granules of which are an aqueous jell of food gelatin containing edible proteins and coated in two pellicles, the inner pellicle consisting of the products of tanning of said jell with vegetable tannins, and the outer pellicle, containing salts of at least one edible polyvalent metal and acid polysaccharide that forms said pellicle.

Owing to the mechanical strength of the outer pellicle consisting of acid polysaccharides, the stability of the synthetic caviar granules increases to about 50° C., while the organoleptic properties inherent in natural caviar, including the property of the granule contents of being in the liquid state at the temperature of the mouth cavity, are preserved.

It is recommendable to use synthetic food caviar containing salts of calcium, aluminium, iron, magnesium, divalent copper, tervalent chromium, zinc or divalent manganese, as the edible salts of polyvalent metals and acid polysaccharides. Calcium and tervalent iron should be given special preference.

It is recommendable to use synthetic food caviar containing salts of water-soluble alginates or low-ester pectins (ester value not higher than 50 percent).

An example of a preferable composition of synthetic food caviar is as follows (in grams per kilogram of caviar):

| | |
|---|---|
| food gelatin | 40–80 |
| edible proteins | 35–140 |
| vegetable tannins | 2–6 |
| salts of edible polyvalent metals and acid polysaccharides | 0.1–2 |
| water | to make 1 kg |

The inner pellicle consisting of the products of gelatin jell tanned with vegetable tannins can contain complex salts of tervalent iron and vegetable tannins in the quantity of 0.001–0.01 g per kg of synthetic. Said complex salts colour the inner pellicle of caviar granules greyish-black.

An aqueous jell of food gelatin in the proposed synthetic caviar can be coloured greyish-black as well. In addition to edible proteins said jell also contains complex salts of tervalent iron and vegetable tannins, in the quantity of 0.001–0.01 g per kg of caviar. Said salts of tervalent iron colour the aqueous jell greyish-black.

In the proposed synthetic caviar, both the aqueous jell of said food caviar and the inner pellicle consisting of the products of gelatin tanned with vegetable tannins, can be coloured greyish-black. In this case both the inner pellicle and the gelatin jell contain complex salts of tervalent iron and vegetable tannins in the quantity if 0.001–0.01 g per kg of caviar.

Moreover, the aqueous jell of food gelatin or the inner pellicle consisting of the products of gelatin tanned with vegetable tannins can be coloured orange-red. In the former case the jell, in addition to edible proteins and, if necessary, other valuable additives (lipids, carbohydrates, vitamins) also contains edible dyes, that colour the jell red-orange, and are contained in the quantity of 0.03–0.2 g per kg of synthetic caviar. If it is the inner pellicle that is coloured, the pellicle contains said edible dyes in the quantity of 0.001–0.01 g per kg of caviar. Said dyes give said red-orange colour to the aqueous jell of food gelatin and the inner pellicle of caviar granules. In this given version, the inner pellicle of caviar granules is formed by a salt of at least one edible polyvalent metal and acid polysaccharide (except a salt of tervalent iron and acid polysaccharide).

If the synthetic caviar granules contain no edible orange-red dyes or complex salts of tervalent iron and vegetable tannins, the granules are uncoloured.

Said caviar has higher nutritive properties, if its aqueous jell of food gelatin contains, in addition to edible proteins, the following substances taken either separately or in various combinations:

(1) lipids, in the quantity of 3–70 g per kg of caviar;
(2) carbohydrates, in the quantity of 3–40 g per kg of caviar;
(3) vitamins, in the quantity of 0.001–0.02 g per kg of caviar.

The mass of the proposed synthetic caviar can also contain other substances, such as vegetable oil, sodium chloride, edible aromatic and flavouring substances, in the following quantities: (in grams per kg of caviar):

| | |
|---|---|
| vegetable oil | 10–100 |
| sodium chloride | 30–50 |
| edible aromatic and flavouring substances | 3–30 |

Moreover, the granular mass can contain the following substances that improve the nutritive properties of said caviar:

(1) lipids and/or native proteins in the quantity of 20–120 g per kg of caviar;
(2) essential amino acids, vitamins, antiseptics, taken either separately or in various combinations, in the quantity of 3–30 g per kg of caviar.

The method for preparing the proposed synthetic, granular caviar consists in that a 4–10 percent aqueous solution of food gelatin containing edible proteins is prepared; said solution is introduced, in the form of droplets, into an edible oil, the temperature of which, at least in its lower layers, is below the temperature at which the droplets of the solution congeal; the thus-shaped granules of gelatin jell containing edible proteins are washed with water to remove the edible oil and treated with aqueous solutions of vegetable tannins; the resulting granules are washed with water to remove said tannins; the washed granules are treated, according to the invention, with aqueous solutions of acid polysaccharides and aqueous solutions of salts of at least one edible polyvalent metal and edible acids; the granules of said caviar can be treated with said solutions in any sequence.

As salts of edible polyvalent metals and edible acids act on acid polysaccharides, the second, outer pellicle, consisting of salts of the edible polyvalent metals and acid polysaccharides is formed on the caviar granules, and it gives them high resistance to temperature (to about 50° C.).

It is recommended that salts of calcium, aluminium, iron, magnesium, divalent copper, tervalent chromium, zinc, or divalent manganese should be used as said salts of edible polyvalent metals and edible acids. The aqueous solutions of these salts of the edible polyvalent metals and edible acids should have a concentration of 0.1–1 percent and a pH from 3 to 7, preferably from 3.5 to 5.

It is recommended to use water-soluble alginates or low-ester pectins (ester value not above 50 percent) in the form of their aqueous solutions having a concentration of 0.1–0.5 percent and a pH from 3 to 7, preferably from 3.5 to 5, as the said acid polysaccharides.

In order to improve the nutritive properties of caviar it is recommended to prepare a 4–10 percent aqueous solution of food gelatin containing, in addition to edible proteins, also lipids, carbohydrates, and vitamins, taken either separately or in various combinations.

The described method can be used to prepare the synthetic caviar granules having their inner pellicles coloured greyish-black. This can be done by using aqueous solutions of salts of tervalent iron and edible acids to treat caviar granules after they are washed with water to remove vegetable tannins. Ions of tervalent iron are sorbed on the inner pellicle of the granules to form complex salts of tervalent iron and vegetable tannins. Said complex salts, as has already been said, give greyish-black colour to the inner pellicle that imitates the colour of natural caviar of sturgeon.

The proposed method can be used to prepare said caviar with its aqueous jell of gelatin also coloured greyish-black. In this case, during preparing the 4–10 percent aqueous solution of food gelatin containing edible proteins and, if necessary, other valuable additives (lipids, carbohydrates, vitamins), salts of tervalent iron and edible acids and vegetable tannins are added to said gelatin solution. The resultant complex salts of tervalent iron and vegetable tannins give said greyish-black colour to the gelatin jell to imitate the colour of natural caviar of sturgeon.

The aqueous jell of food gelatin can be coloured greyish-black in addition to colouring the inner pellicle of said caviar granules using the same method.

The proposed method can be used also to colour the aqueous jell of gelatin in orange-red shades. In this case, during preparing the starting 4-10 percent aqueous solution of food gelatin containing edible proteins and, if necessary, the above-named valuable additives, orange-red edible dyes are also added to said solution. These dyes colour the aqueous jell of gelatin red-orange to imitate the colour of natural caviar of salmon. In the herein-described version, the synthetic caviar granules washed from vegetable tannins, are treated with aqueous solutions of acid polysaccharides and aqueous solutions of salts of at least one edible polyvalent metal and edible acids, except aqueous solutions of salts of tervalent iron. Said caviar granules can be given said treatment with said solutions in any sequence.

The proposed method can be used also to prepare synthetic caviar granules with their inner pellicles coloured orange-red. In this case a 4-10 percent aqueous solution of food gelatin, containing edible proteins is first prepared, and it is then introduced, in the form of droplets, into an edible oil, the temperature of which, at least in its lower layers, is below the temperature at which said droplets congeal; the thus-shaped gelatin jell granules are washed with water to remove the edible oil, and treated with an aqueous solutions of vegetable tannins; the resulting synthetic caviar granules can be either washed or not washed (which is preferable) with water and treated with aqueous solutions of edible dyes that give them orange-red colour; next the caviar granules are treated with aqueous solutions of acid polysaccharides and aqueous solutions of salts of at least one edible polyvalent metal and edible acids, except aqueous solutions of ferric salts; the granules can be given said treatment with said solutions in any sequence.

The proposed method can be used to prepare synthetic caviar granules in which both the aqueous jell of food gelatin and the inner pellicle consisting of the products of gelatin jell tanned with vegetable tannins, are coloured orange-red.

In the proposed method, in cases where aqueous solutions of edible orange-red dyes or aqueous solutions of salts of tervalent iron and edible acid are not used, uncoloured granules of caviar are obtained, which imitate in their appearance caviar of perch, pike-perch, bream, and other less valuable fish.

Both coloured and uncoloured synthetic caviar granules are recommended to be given a culinary treatment consisting in curing with sodium chloride and adding vegetable oil, and flavouring substances. Furthermore other valuable substances that improve the nutritive properties of caviar can be added at the stage of the culinary treatment; these substances are lipids, native proteins, indispensable amino acids, vitamins, and anticeptics, taken either separately or in various combinations.

Thus, the proposed method can be used to prepare food caviar that imitates, with respect to its taste and colour, natural caviar of any fish, including caviar of valuable fish such as sturgeon and salmon.

For a better understanding of the invention, the following examples of its practical embodiment are given by way of illustration.

EXAMPLE 1

Prepare 100 kg of a 7 percent aqueous solution of food gelatin containing the protein casein. To do so, dissolve 15 kg of casein in a 0.1 N solution of sodium hydroxide at a temperature of 50°-60° C. and mix for 60-120 minutes. Now add, with stirring, 7 kg of food gelatin in the form of a 20-30 percent aqueous solution. Continue mixing for another 30-60 minutes at a temperature of 50°-60° C.

Introduce the prepared solution in the form of droplets into corn oil, and see to it that the temperature of oil in its lower layers is kept constant at the level of 4°-7° C. In these conditions the droplets of the starting solution form regular spheres having the diameter of 2-4 mm. As the droplets are cooled in the lower layers of corn oil, the solution turns into jell.

Wash the shaped granules of gelatin containing casein with water to remove corn oil with stirring for 3-5 minutes at a temperature of 4°-15° C. Now separate the granules from water, and treat with an aqueous solution of vegetable tannins. To prepare this solution, boil 15-20 kg of green tea or crushed tea leaves in 350 liters of water for 60 minutes. Cool the extract (solution of tanning substances) to 4°-10° C. before use. Treat the caviar granules with this solution by keeping them in it for 20-35 minutes at a temperature of 4°-10° C. A dense, slightly yellowish pellicle consisting of the products of gelatin jell tanned with vegetable tannins is formed on each granule as a result of this treatment.

The tanned granules are now washed with water to remove unreacted tannins. To that end stir the granules in water for 5-7 minutes at a temperature of 7°-15° C. Treat the washed granules with a 0.1 percent aqueous solution of acid polysaccharide, sodium alginate, having the pH 5-6, at a temperature of 4°-15° C. for 15 minutes. Now separate the granules from the solution of sodium alginate and treat for 2-5 minutes, at a temperature of 4°-15° C., with a 0.3-0.8 percent aqueous solution of calcium acetate (the pH 4-5). As a result of treating caviar granules with the aqueous solution of acid polysaccharide and calcium acetate, the second, outer pellicle consisting of calcium alginate is formed on the granule, to give it high thermal stability.

Now wash the caviar granules with water with stirring for 2-3 minutes at a temperature of 4°-15° C. The yield is 105-115 kg of product. (The gain in weight, compared with the starting weight of the 7 percent aqueous solution of food gelatin, is due to swelling of the granules as they are treated in aqueous media).

The obtained food caviar (uncoloured, with granules coated in two pellicles) contains the following components, in grams per kg of caviar:

| food gelatin | 60-65 |
| casein | 130-140 |
| vegetable tannins | 2-4 |
| calcium alginate | 0.1-1 |
| water | to make 1 kg |

The tests have shown that the obtained caviar granules can stand the temperature that exceeds the point at which the gelatin jell melts, namely 35° C., for 60 minutes.

EXAMPLE 2

Caviar (uncoloured, coated in two pellicles) is prepared by a procedure similar to that described in Example 1, except that a 0.2 percent aqueous solution of low-ester pectin (ester value 40 percent), having the pH 4–5, is used instead of the 0.1 percent aqueous solution of sodium alginate.

The obtained caviar can stand the temperature exceeding the point at which the gelatin jell melts, namely the temperature of 40° C., for 45 minutes.

EXAMPLE 3

Food caviar (uncoloured, coated in two pellicles) is prepared by a procedure similar to that described in Example 1, except that a mixture of a 0.1 percent aqueous solution of sodium alginate and a 0.15 percent aqueous solution of low-ester pectin (ester value 40 percent), having the pH 3–4, is used as the aqueous solution of acid polysaccharide.

EXAMPLE 4

Prepare 100 kg of a 8 percent aqueous solution of food gelatin containing a mixture of edible proteins, lipids, and carbohydrates, namely a mixture of casein and dry milk. To do so, dissolve 5 kg of casein in a 0.1 N aqueous solution of sodium hydroxide at a temperature of 50°–60° C. with stirring for 1–2 hours. Add 10 kg of dry milk and 8 kg of food gelatin, in the form of a 20–30 percent aqueous solution, into the obtained casein solution and mix for 0.5–1 hours at a temperature of 50°–60° C. Introduce the obtained solution in the form of droplets into a mixture of one part of corn oil and two parts of cotton-seed oil, seeing to it that the temperature of oil in its lower layers is maintained below the point at which the gelatin solution droplets congeal, namely 4°–7° C. In these conditions the solution droplets form regular spheres having the diameter of 2–4 mm. As they are cooled in the lower layers of the oil, gelatin is converted into a jell.

The thus-shaped granules of gelatin jell containing edible proteins (casein, lactalbumin, lactoglobulin, etc), and also lipids and carbohydrates, are washed with water to remove the oil. To do so, mix the granules for 3–5 minutes at a temperature of 4°–10° C. in water, then separate from water and treat with 300 liters of a 0.3–0.5 percent aqueous solution of vegetable tannins. To prepare the tannin solution, dissolve a dry preparation of vegetable tanning substances (tea tannides) in water. Treat the granules with this solution at a temperature of 4°–10° C. with stirring for 20–30 minutes until a dense, slightly yellowish pellicle consisting of the products of gelatin jell tanned with vegetable tannins, is formed of the granules.

After tanning, wash the granules with water to remove unreacted vegetable tannins at a temperature of 7°–15° C. for 3–5 minutes with stirring. Now treat the granules with a 0.1 percent aqueous solution of acid polysaccharide xanthane, having the pH 4–6, at a temperature of 4–15° C. for 15 minutes. Separate the granules from the xanthane solution and treat for 5–7 minutes at a temperature of 4°–15° C. and the pH 4–5 in a 0.1–0.15 percent aqueous solution of calcium acetate. As a result of this treatment, an outer pellicle consisting of the calcium salt of xanthane, is formed on the granule to give it high thermal stability.

Wash the obtained caviar granules with water at a temperature of 4°–15° C. with stirring for 3–5 minutes. The yield is 115 kg of product.

The obtained food caviar (uncoloured, with granules coated in two pellicles) contains the following components, in grams per kg of caviar:

| | |
|---|---|
| food gelatin | 70 |
| casein | 45 |
| other native proteins (lactalbumin, lactoglobulin, etc) | 20 |
| lipid | 25 |
| carbohydrates | 15 |
| vegetable tannins | 2–4 |
| calcium salt of xanthane | 0.1–1 |
| water | to make 1 kg |

The thermal stability of the obtained product is similar to that of product obtained in Example 1.

EXAMPLE 5

Prepare 100 kg of a 10 percent aqueous solution of food gelatin containing casein as edible protein and starch as carbohydrate. To do so, dissolve 12 kg of casein in a 0.1 N aqueous solution of soda at a temperature of 50°–60° C. with stirring for 60–120 minutes. Add, with stirring, 10 kg of food gelatin in the form of a 20–30 percent aqueous solution. Now add 5 kg of soluble starch into thus prepared solution containing casein and gelatin, and mix for 30–60 minutes at a temperature of 50°–60° C.

Introduce the obtained solution in the form of droplets into a mixture of equal parts of corn and cotton-seed oils, seeing to it that the temperature of the oil in its lower layers is below the point at which the solution droplets congeal, namely 3°–5° C. In these conditions the droplets of the solution form regular spheres having the diameter of 2–4 mm. As they are cooled in the lower layers of the oil mixture, gelatin is converted into jell.

The formed granules of gelatin jell containing casein and starch are washed with water to remove residual oils. To do so stir the granules in water for 3–5 minutes at a temperature of 4°–15° C. Now separate the granules from water and treat with an aqueous solution of vegetable tannins. To prepare this solution, boil 40–45 kg of finely cut coarse tea leaves (or waste materials of tea cultivating farms that remains after seasonal shaping of tea bushes) in 300 liters of water for one hour. Cool the extract before using to 4°–7° C., and treat the caviar granules by keeping them in the solution at a temperature of 4°–15° C. with stirring for 20–35 minutes. A dense, slightly yellowish pellicle consisting of the products of gelatin jell tanned with vegetable tannins is formed on the granules.

Now wash the granules with water to remove unreacted tannins. Do it for five minutes at a temperature of 7°–15° C. with stirring. Treat the washed granules with a 1 percent aqueous solution of calcium chloride having the pH 4–7 at a temperature of 4°–15° C. for the minutes, and separate the granules from calcium chloride. Now treat the granules for 15 minutes with a 0.2% aqueous solution of a mixture of sodium alginate and low-ester pectin (ester value 40 percent), taken in the weight ratio of 1:1, at a temperature of 4°–15° C., the pH being 4–6. As a result of treatment of caviar granules with the solution of acid polysaccharides and calcium chloride, an outer pellicle consisting of alginate and pectinate of calcium is formed on the granules to give them high thermal stability. In the end of treatment with the aqueous solution of a mixture of sodium alginate and pectin, the granules are washed with water. The yield of product is 125 kg.

The prepared food caviar contains the following components in grams per kg of caviar:

| food gelatin | 80 |
|---|---|
| casein | 95 |
| starch | 40 |
| vegetable tannins | 3–5 |
| alginate and pectinate of calcium | 0.3–0.6 |
| water | to make 1 kg |

The obtained food caviar stands the temperature of 50° C. for thirty minutes.

EXAMPLE 6

Food caviar (uncoloured with granules coated in two pellicles) is prepared by the same procedure as described in Examples 1, 2 and 3, except that cod-liver oil is added to the casein solution in the quantity of 0.3–6 kg before mixing the casein solution with the aqueous solution of gelatin. The quantity of cod-liver oil in the finished product is thus 3–57 g per kg of caviar.

EXAMPLE 7

Food caviar (uncoloured, with granules coated in two pellicles) is prepared by a procedure similar to that described in Examples 1, 2 and 3, except that before mixing the casein solution with the aqueous solution of gelatin, starch is added to the casein solution in the quantity of 0.3–3 kg, which corresponds to 3–27 g per kg of the finished product.

EXAMPLE 8

Food caviar (uncoloured, with granules coated in two pellicles) is prepared by the procedure similar to that described in Examples 1, 2, and 3, except that before mixing the casein solution with the aqueous solution of gelatin, cod-liver oil and starch are added to the casein solution in quantities of 0.3–6 kg and 0.4–4 kg, respectively which corresponds to 3–57 g of cod-liver oil and 4–38 g of starch per kg of the finished product.

EXAMPLE 9

Prepare 100 kg of a 10 percent aqueous solution of food gelatin containing edible protein casein, and lipids-edible vegetable oils.

To do so, a stable emulsion is first prepared from vegetable oils in casein solution. The emulsion is prepared as follows. Mix 45 kg of a 10 percent solution of casein in a 0.1 N solution of sodium hydroxide with 13 kg of a 0.1 percent aqueous solution of low-ester pectin (ester value 40 percent), and simultaneously prepare an emulsion of 0.8 kg of a 0.2 percent aqueous solution of calcium acetate in a mixture of 4.3 kg of corn oil and 4.3 kg of cotton-seed oil. Introduce the emulsion of calcium acetate in vegetable oils into the casein and pectin solution with stirring to prepare a new emulsion in which the continuous phase is the casein solution and the dispersed phase is the mixture of corn and cotton-seed oils. The ratio of the volumes of the dispersed phase to the continuous phases is 0.15:1. Calcium pectinate performs the role of a stabilizing agent. The emulsifying conditions should be so selected that the viscosity of the emulsion should be 100–200 poise at 20° C. The obtained emulsion does not delaminate on storage in a refrigerator for 20 days at a temperature of 4°–8° C.

Now add 10 kg of gelatin in the form of a 20–30 percent aqueous solution to the obtained emulsion to prepare a 10 percent aqueous solution of gelatin containing casein and edible vegetable oils (corn and cotton-seed oils). The further procedure is the same as in Example 1.

The yield is 125 kg of uncoloured caviar with granules coated in two pellicles. The caviar stands the temperature of 40° C. for 45 minutes. The granule contents are not delaminated when stored in a refrigerator at a temperature of 4°–8° C. for two weeks.

The composition of the obtained caviar is as follows, in grams per kg of caviar:

| food gelatin | 80 |
|---|---|
| casein | 35 |
| vegetable oils | 70 |
| vegetable tannins | 2–4 |
| alginate and pectinate of calcium | 1.5–2 |
| water | to make 1 kg. |

EXAMPLE 10

Food caviar (uncoloured, with granules coated in two pellicles) is prepared by a procedure similar to that described in Example 9 except that a 0.1 percent aqueous solution of sodium alginate is used in preparing food emulsion instead of a 0.1 percent aqueous solution of low-ester pectin.

EXAMPLE 11

Food caviar (uncoloured, with granules coated in two pellicles) is prepared by a procedure similar to that described in Examples 9 and 10, except that to 50 percent (by volume) of vegetable oils in the composition of the food emulsion are replaced with cod-liver oil.

EXAMPLE 12

Food caviar (uncoloured, with granules coated in two pellicles) is prepared by a procedure similar to that described in Examples 1, 2 and 3, except that dry defatted milk is used in the quantity of 15 kg instead of edible casein. Dry milk is dispersed in water, and 10 kg of food gelatin, in the form of a 20–30 percent aqueous solution, are added to the obtained dispersion.

EXAMPLE 12

Food caviar (uncoloured, with granules coated in two pellices) is prepared by a procedure similar to that described in Example 12, except that cod-liver oil is added to the dispersion of dry defatted milk in the quantity of 0.3–6 kg.

EXAMPLE 14

Food caviar (uncoloured, with granules coated in two pellicles) is prepared by a procedure similar to that described in Examples 1, 2 and 3, except that condensed milk (without sugar) is used in the quantity of 80 kg instead of casein solution. 6 kg of food gelatin, dissolved in 14 liters of water at a temperature of 40°–50° C., are added to condensed milk at a temperature of 40°–60° C. with stirring. The obtained solution has the specific gravity of 1.07 at 40° C. and the viscosity of 79 poise at 40° C.

Food caviar prepared in this Example stands the temperature of 35° C. for 60 minutes.

EXAMPLE 15

Food caviar (uncoloured, with granules coated in two pellicles) is prepared by a procedure similar to that described in Example 14, except that soya-bean milk is used in the quantity of 79–79.7 kg instead of condensed milk without sugar. 0.3–1 kg of cod-liver oil is added to soya-bean milk, and to the obtained mixture, with stirring, added are 6 kg of food gelatin at a temperature of 40°–60° C. (dissolved preliminarily in 14 liters of water).

EXAMPLE 16

Food caviar (uncoloured, with granules coated in two pellicles) prepared in Example 1 is treated to acquire the organoleptic properties imitating those inherent in natural caviar of sturgeon. The culinary treatment consists in the following.

Granules coated in two pellicles are kept for five minutes at a temperature of 4°–15° C. in a 4–6 percent aqueous solution of sodium chloride. After salting, 0.3 percent by weight of sodium glutamate, 1 percent by weight of corn oil, and 2.7 percent by weight of herring flesh, finely disintegrated in corn oil, are added to the granules, to prepare 112–122 kg of the finished product.

The obtained food caviar contains the following components, in grams per kg of caviar:

| | |
|---|---|
| food gelatin | 57–64 |
| casein | 125–135 |
| vegetable tannins | 2–4 |
| calcium alginate | 0.1–1 |
| sodium chloride | 30 |
| herring flesh | 27 |
| sodium glutamate | 3 |
| corn oil | 10 |
| water | to make 1 kg |

EXAMPLE 17

Food caviar (uncoloured, with granules coated in two pellicles) prepared in Example 5 is treated to obtain the organoleptic properties imitating those inherent in natural caviar. The culinary treatment consists in the following.

The granules coated in two pellicles are cured with sodium chloride as described in Example 16. Next added are 0.3 percent by weight of sodium glutamate and 12 percent by weight of food emulsion containing casein, corn oil, cod-liver oil, and flavouring substances.

The food emulsion is prepared as follows.

Mixed together are 200 ml of a 15 percent solution of casein in a 0.1 N solution of sodium hydroxide, 100 ml of a 0.1 percent aqueous solution of beet-root pectin (or a 0.1 percent solution of sodium alginate), 1.06 g of flavouring substances, viz.: 0.4 g of sodium inosinate and 0.33 g portions of 1-tryptophan, and 0.9 ml of alcoholic solution of flavoring aromatic substances of the following composition (in percent by weight):

| | |
|---|---|
| trimethylamine | 4.9 |
| triethylamine | 9.5 |
| pyridine | 1.9 |
| piperidine | 4.8 |
| n-propylamine | 4.8 |
| diethylacetal of n-valeric aldehyde | 4.8 |
| ethyl alcohol | 67.4 |

Simultaneously mix 500 ml of corn (or its 1:1 mixture with cotton-seed oil) and 150 ml of cod-liver oil and emulsify in this mixture 50 ml of a 0.2 percent aqueous solution of calcium acetate. Introduce the obtained emulsion, in the form of a thin jet in the emulsifying conditions, into a solution containing casein, pectin, flavouring substances and other additives. The emulsifying conditions should be so selected that the finished emulsion should have the viscosity of 100–200 poise at 20° C.

The obtained emulsion can stand without delamination at a temperature of 4°–8° C. for 20 days.

The resultant product weighs 140 kg and contains the following components, in grams per kg of caviar:

| | |
|---|---|
| food gelatin | 70 |
| casein | 89 (85 g in the aqueous jell of gelatin and 4 g in the granular mass of caviar) |
| starch | 35 |
| vegetable tannins | 4–6 |
| calcium alginate and calcium pectinate | 0.5–1. |
| sodium chloride | 30 |
| sodium glutamate | 3 |
| sodium inosinate | 0.048 |
| maltol | 0.040 |
| L-tryptophan | 0.040 |
| flavouring substances | 0.036 |
| ethyl alcohol | 0.07 |
| corn oil | 60 |
| cod-liver oil | 18 |
| water | to make 1 kg |

The finished product, that is, food caviar, imitates with respect to its taste and odour, natural caviar of sturgeon. Its consistency is loose and granular. The granules can stand the temperature of 40° C. for 45 minutes.

EXAMPLE 18

Food caviar (uncoloured, with granules coated in two pellicles) is prepared by a procedure similar to that described in Example 17, except that in order to protect caviar granules from bacterial contamination, after curing with sodium chloride, they are treated with an aqueous solution of formaldehyde (having the concentration of 0.01–1 percent) for 0.5–5 minutes. The formaldehyde solution ratio to the weight of granular mass is from 0.5:1 to 10:1.

EXAMPLE 19

Food caviar (uncoloured, with granules coated in two pellicles) prepared in Example 1 is given a culinary treatment in order to give the caviar the organoleptic properties imitating those inherent in natural caviar, and also to increase its biological value and to preserve it from bacterial contamination. The culinary treatment consists in the following: the granules coated in two pellicles are kept at a temperature of 4°–15° C. in an aqueous solution containing 20 percent by weight of yeast hydrolyzate and 4–6 percent by weight of sodium chloride. The treatment continues for four minutes. During the treatment, the content of dry substances in the caviar granules increases on account of diffusion into them of amino acids (including essential amino acids), peptides, and sodium chloride) and also on account of partial dehydration of the granules. Thus-treated granules of caviar are separated from the liquid, and 0.3 percent by weight of sodium glutamate, 0.1 percent by weight portions of sorbic and ascorbic acids, 2 percent by weight of cod-liver oil, 10 percent by weight of corn oil, 0.004 percent by weight of sodium inosinate, 0.03 percent by weight portions of maltol and L-tryptophan, and 0.006 percent by weight of alcoholic solution of flavouring substances are added. The composition of the flavouring substances is specified in Example 17.

The resultant product weighs 125–135 kg and contains the following components, in grams per kg of caviar:

| | |
|---|---|
| food gelatin | 52–56 |
| casein | 110–120 |
| vegetable tannins | 3–5 |
| calcium alginate | 0.3–0.6 |
| sodium chloride | 50 |
| sodium glutamate | 3 |
| sodium inosinate | 0.04 |
| maltol | 0.03 |
| L-tryptophan | 0.03 |
| flavouring substances | 0.02 |
| ethyl alcohol | 0.04 |
| corn oil | 100 |
| cod-liver oil | 20 |
| amino acids, including essential amino acids and peptides (from yeast hydrolyzate) | 28 |
| sorbic acid | 1 |
| ascorbic acid | 1 |
| water | to make 1 kg |

The finished product imitates, with respect to its taste and odour, natural caviar of sturgeon. The granules can stand the temperature of 50° C. for 15 minutes.

EXAMPLE 20

Food caviar (uncoloured, with granules coated in two pellicles) is prepared by a procedure similar to that described in Examples 1 and 2, except that a 0.2–1 percent aqueous solution of aluminium-potassium sulphate and aluminium-ammonium sulphate, having the pH 3.8–4.2, is used instead of the aqueous solution of calcium acetate.

The resultant caviar has the second outer pellicle formed by aluminium alginate or aluminium pectinate.

EXAMPLE 21

Food caviar (uncoloured, with granules coated in two pellicles) is prepared by a procedure similar to that described in Examples 1 and 2, except that a 0.1–0.3 percent aqueous solution of aluminium chloride, having the pH 3.8–4.2, is used instead of the aqueous solution of calcium acetate.

The resultant caviar has granules with the outer pellices consisting of aluminium pectinate or aluminium alginate.

EXAMPLE 22

Food caviar (uncoloured, with granules coated in two pellicles) is prepared by a procedure similar to that described in Examples 1 and 2, except that an aqueous solution containing calcium chloride and aluminium chloride, and having the pH 4, is used instead of the aqueous solution of calcium acetate. The total concentration of salts is 0.8. The ratio of the concentrations of $Ca^{2+}$ and $Al^{3+}$ ions (in grams-ions) is 2:1.

The resultant caviar has its granules coated in the outer pellicle consisting of calcium alginate, calcium pectinate, aluminium alginate, or aluminium pectinate.

EXAMPLE 23

Food caviar is prepared by a procedure similar to that described in Example 9, except that 4.2–84 g of vitamin A concentrate, having the activity of 100,000 Units per gram of the concentrate, are added to the mixture of corn and cotton-seed oils. One kilogram of the finished product contains 0.001–0.02 g of vitamin A.

EXAMPLE 24

Food caviar is prepared by a procedure similar to that described in Example 17, except that 5 g of vitamin A concentrate (having the activity of 100,000 units in gram of the concentrate) are added to the vegetable oil used for preparing the emulsion. One kilogram of the finished product contains 0.0011 g of vitamin A.

EXAMPLE 25

Prepare 100 kg of a 7 percent aqueous solution of food gelatin containing casein. To that end dissolve 15 kg of casein in a 0.1 N aqueous solution of sodium hydroxide with stirring for one hour at a temperature of 50°–60° C. Add with stirring 7 kg of food gelatin in the form of 20–30 percent aqueous solution into the obtained casein solution. Stir the mixture for another hour at a temperature of 50°–60° C.

Pass the obtained starting solution, having the pH 6.2, through a filter cloth and introduce it, in the form of droplets into vaseline oil of pharmaceutical grade. The temperature of the upper layers of the oil should be 25°–40° C. and of the lower layers 4°–10° C. In these conditions the droplets of the starting solution assume the shapes of regular spheres having the diameter of 2–4 mm. As they are cooled in the lower layers of the oil, gelatin solution is converted in to jell.

The shaped granules of gelatin jell containing casein are washed with water to remove oil. To do so, stir the granules in water for 3–5 minutes at a temperature of 4°–10° C. Now separate the granules from water and treat with an aqueous solution of vegetable tannins. Prepare the tannin solution by boiling 15–20 kg of green tea in 300 liters of water for an hour and cool to 4°–10° C. before use. Treat the granules with this solution at a temperature of 4°–10° C. with stirring for 25–30 minutes. As a result of this treatment a dense, slightly yellowish pellicle, consisting of the products of gelatin jell tanned with the vegetable tannins, is formed on the granule surface. In the end of the tanning process, wash the granules with water to remove unreacted tannins at a temperature of 4°–10° C. with stirring for 3–5 minutes. Treat the washed granules with a 0.1 percent aqueous solution of ferric chloride for 1–2 minutes, at a temperature of 4°–10° C., with stirring. As a result of this treatment the pellicle consisting of the products of gelatin jell tanned with vegetable tannins is coloured greyish-black with a brownish tint. The colouration is due to the formation of complex salts of ferric iron with the vegetable tannins.

The coloured granules of caviar are separated from the ferric chloride solution, washed with water for three minutes at a temperature of 4°–10° C. and then treated with stirring with a 0.25 percent aqueous solution of low-ester pectin (ester value 20–40 percent), having the pH 4.5–5.5. The treatment should be done at a temperature of 4°–10° C. for 10–15 minutes. The granules are then washed with water at a temperature of 4°–10° C. for 1–5 minutes, and then treated with a 1 percent aqueous solution of calcium acetate having the pH 4.5–6.5 at a temperature of 4°–10° C. for 3–5 minutes. As a result of this treatment of caviar granules with the aqueous solution of pectin and calcium acetate, an outer pellicle consisting of calcium pectinate is formed on the granules to give them thermal stability.

Separate the caviar granules coated in two pellicles from the solution of calcium acetate and wash with water at a temperature of 4°–10° C. for 3–5 minutes. The resultant product weighs 115 kg, and contains the following components, in grams per kg of caviar:

| | |
|---|---|
| food gelatin | 60 |
| casein | 130 |
| vegetable tannins | 2–3 |
| calcium pectinate and ferric pectinate | 0.1–0.6 |
| complex salts of ferric iron and vegetable tannins | 0.003–0.007 |
| water | to make 1 kg |

The product can stand the temperature of 40° C. for an hour and imitates well, with respect to its colour, natural caviar of sturgeon.

EXAMPLE 26

Food caviar, prepared in Example 25, is given a culinary treatment consisting in the following:

Caviar granules coated in two pellicles, are washed with a 3–7 percent aqueous solution of sodium chloride at a temperature of 4°–10° C. for 3–5 minutes. After curing the granules with the sodium chloride solution, a 0.2–0.5 percent by weight of sodium glutamate, 0.1 percent by weight portions of sorbic and ascorbic acids, 0.01–0.1 percent by weight of sodium inosinate 2–7 percent by weight of dry milk, 4–10 percent by weight of a mixture of equal parts of corn and cotton-seed oils, 1–5 percent by weight of cod-liver oil, 0.3–1.5 percent by weight of herring juice, 1–2.5 percent by weight of soya-bean protein hydrolyzate are added with stirring. The resultant product weighs 132–146 kg.

The obtained food caviar contains the following components in grams per kg of caviar:

| | |
|---|---|
| food gelatin | 48–53 |
| casein | 100–105 |
| vegetable tannins | 2–4 |
| pectinates of calcium and tervalent iron | 2–4 |
| complex salts of tervalent iron and vegetable tannins | 0.003–0.007 |
| sodium chloride | 40 |
| herring juice | 3–15 |
| sodium glutamate | 2–5 |
| sodium inosinate | 0.1–1 |
| corn oil | 20–50 |
| cotton-seed oil | 20–50 |
| cod-liver oil | 10–50 |
| dry milk | 20–70 |
| hydrolyzate of soya-bean protein | 10–25 |
| sorbic acid | 1 |
| ascorbic acid | 1 |
| water | to make 1 kg |

The product can stand the temperature of 40° C. for an hour and well imitates, with respect to its colour and taste, natural caviar of sturgeon.

EXAMPLE 27

Food caviar, imitating natural caviar of sturgeon, is prepared by a procedure similar to that described in Example 25, except that a 0.1–0.2 percent aqueous solution of sodium alginate having the pH 4–6, is used instead of aqueous solution of pectin.

The resultant caviar has its granules with the outer pellicle formed by calcium alginate and tervalent iron.

EXAMPLE 28

Food caviar, imitating natural caviar of sturgeon, is prepared by a procedure similar to that described in Example 25, except that a 0.1 percent aqueous solution of xanthane, having the pH 6–7, is used instead of the aqueous solution of pectin, and a 0,3 percent aqueous solution of ferric malate is used instead of the aqueous solution of ferric chloride.

The resultant caviar has its granules coated in the outer pellicle consisting of calcium and iron salts of xanthane.

EXAMPLE 29

Prepare 100 kg of a 5 percent aqueous solution of food gelatin containing casein. To do so, dissolve 14 kg of casein in a 0.1 N aqueous solution of sodium hydroxide with stirring for two hours at a temperature of 50°–60° C. Add 5 kg of food gelatin in the form of a 20–30 percent aqueous solution into the obtained casein solution. Stir the mixture for another hour at a temperature of 50°–60° C.

Pass the obtained solution, having the pH 6.1–6.3, through a filter cloth, and introduce it in the form of droplets into cotton-seed oil the upper layers of which have the temperature of 30°–45° C. while in the lower layers of the oil the temperature is 5°–8° C. In these conditions the droplets of the starting solution form regular spheres having the diameter of 2–4 mm that quickly, without coalescing, pass the upper layers of oil, the viscosity of which is decreased at elevated temperature, and slowly immerse into the lower layers of oil having low temperature, where the gelatin solution converts into jell.

The shaped granules of gelatin jell should be washed with water at a temperature of 4°–10° C. with stirring for 5 minutes to remove cotton-seed oil. Now treat the granules with an aqueous solution of vegetable tannins. Prepare the tanning solution by boiling 15–20 kg of tea dust (wastes of te production of green tea resulting from tea cutting, packaging, etc) in 300–400 liters of water for an hour. Cool the solution before use to 4°–8° C. Treat the granules with the tanning solution at a temperature of 4°–8° C. with stirring for 15–20 minutes. As a result of this treatment, a dense, slightly yellowish pellicle consisting of the products of tanning the gelatin jell with the vegetable tannins, is formed.

On the termination of the tanning process, wash the granules with water at a temperature of 4°–8° C. for 3–5 minutes to remove unreacted tannins and treat for 3–5 minutes at a temperature of 4°–10° C. with stirring, with a 0.1 percent solution of ferric chloride containing 0.5 percent of calcium chloride, and having the pH 4–5. As a result of this treatment, the pellicle consisting of the products of gelatin jell tanning with vegetable tannins is coloured greyish-black. The colouration is due to formation of complex salts of tervalent iron and vegetable tannins.

The coloured granules are separated from the solution of iron and calcium salts, washed with water for three minutes at a temperature of 4°–10° C., and treated with a 0.2 percent aqueous solution of low-ester pectins (ester value 40 percent) having the pH 5.3–5.5. The treatment is carried out at a temperature of 4°–15° C. for 15 minutes. As a result of this treatment, an outer pellicle consisting of pectinates of calcium and tervalent iron is formed on the caviar granules to give them thermal stability.

The granules coated in two pellicles are washed with a 4–6 percent solution of sodium chloride at a temperature of 4°–15° C. for five minutes (salting). Then 0.3 percent by weight of sodium glutamate, 0.1 percent by weight portions of sorbic and ascorbic acids, 2.8 percent by weight of hydrolyzate of soya-bean protein, 10 percent by weight of corn oil, and 4 percent by weight of herring flesh, finely disintegrated in corn oil, are added to the granules. As a result of this process 122 kg of caviar are produced.

The obtained products contains the following components, in grams per kg of caviar:

| food gelatin | 40 |
| casein | 115 |
| vegetable tannins | 3–4 |
| pectinates of calcium and tervalent iron | 0.3–0.8 |
| complex salts of tervalent iron and vegetable tannins | 0.001–0.005 |
| sodium chloride | 45 |
| sodium glutamate | 3 |
| herring flesh | 4 |
| corn oil | 100 |
| hydrolyzate of soya-bean proteins | 28 |
| sorbic acid | 1 |
| ascorbic acid | 1 |
| water | to make 1 kg |

The finished product imitates, with respect to its taste and appearance, natural caviar of sturgeon.

The granules of the product can stand the temperature of 35°–40° C. for an hour.

EXAMPLE 30

Food caviar imitating natural caviar of sturgeon is prepared by a procedure similar to that described in Example 29, except that a 0.1–0.2 percent aqueous solution of sodium alginate having the pH 5–6 is used instead of the aqueous solution of pectin.

The resultant product is food caviar the granules of which have its outer pellicles formed by alginates of calcium and of tervalent iron.

EXAMPLE 31

Food caviar imitating natural caviar of sturgeon is prepared by a procedure similar to that described in Example 29, except that a 0.2 percent aqueous solution of xanthane, having the pH 6–7, is used instead of the aqueous solution of pectin.

The resultant caviar has its granules coated in the second pellicle formed by calcium and iron salts of xanthane.

EXAMPLE 32

Food caviar, imitating natural caviar of sturgeon is prepared by a procedure similar to that described in Example 29, except that after processing caviar granules with an aqueous solution containing a mixture of ferric chloride and calcium chloride, the granules are not treated with the aqueous solution of low-ester pectin, but treated with an aqueous solution containing a mixture of 0.1 percent by weight of sodium alginate and 0.15 percent by weight of low-ester pectin (ester value 40 percent). The treatment is continued for 15 minutes at a temperature of 4°–15° C., the pH of the solution being 5.3–5.5.

The resultant caviar has its granules coated in the outer pellicle consisting of alginates and pectinates of calcium and of tervalent iron.

EXAMPLE 33

Prepare 100 kg of a 7 percent aqueous solution of food gelatin containing edible casein. To do so, dissolve 17 kg of casein is a 0.1 N aqueous solution of sodium hydroxide at a temperature of 50°–60° C. with stirring for 1–2 hours. Add, at a temperature of 50°–60° C. and with stirring, 7 kg of food gelatin in the form of a 20–30 percent aqueous solution. Continue stirring at the same temperature for another hour.

Introduce the obtained solution containing gelatin and casein, in the form of droplets, into corn oil, the lower layer of which is cooled to a temperature of 4°–7° C. In these conditions the droplets of the starting solution form regular spheres of 2–4 mm in diameter, and as they are cooled, the gelatin solution converts into jell.

The shaped granules of gelatin jell containing casein are separated from the oil and washed with water at a temperature of 4°–15° C. for three or five minutes. The granules are then treated with an aqueous solution of vegetable tannins that is prepared by dissolving dry preparation of vegetable tannins (tea tannides) in water. The granules of caviar are treated with this solution at a temperature of 4°–15° C. for 20–25 minutes. As a result of this treatment a slightly yellowish pellicle consisting of the products of gelatin jell tanned with the vegetable tannins is formed.

Upon the termination of the tanning process, caviar granules are washed with water at a temperature of 4°–15° C. for 3–5 minutes to remove unreacted vegetable tannins. The granules are then treated with a 0.2–0.3 percent aqueous solution of ferric lactate (the pH of the solution 4–5) containing 0.2–1 percent of calcium acetate. The treatment is carried out at a temperature of 4°–15° C. for 2–5 minutes. As a result of this treatment, the pellicle consisting of the products of gelatin jell tanning with vegetable tannins is coloured greyish-black with a brownish tint.

The coloured granules are separated from the solution of iron and calcium salts, washed with water, and treated with a 0.2 percent aqueous solution of sodium alginate having the pH 4–5. The treatment should be carried out at a temperature of 4°–15° C. for ten minutes. As a result of this treatment the second, outer pellicle consisting of alginates of calcium and of tervalent iron, is formed on the granules to give them thermal stability.

The obtained caviar granules are given a culinary treatment for which purpose added are 4.5 percent by weight of sodium chloride, 0.2 percent by weight of sodium glutamate, 0.1 percent by weight of sorbic acid, 0.2 percent by weight of ascorbic acid, and 10 percent of corn oil, into which 5 percent (of the weight of oil) of dispersed natural sturgeon caviar are added to give caviar the specific taste and odour. The yield of product is 140 kg.

The obtained food caviar contains the following components, in grams per kg of caviar:

| food gelatin | 50 |
| casein | 120 |
| vegetable tannins | 4–6 |

| | |
|---|---|
| alginates of calcium and iron | 1–2 |
| complex salts of tervalent iron and vegetable tannins | 0.005–0.01 |
| corn oil | 95 |
| sodium chloride | 45 |
| sodium glutamate | 2 |
| natural sturgeon caviar | 5 |
| sorbic acid | 1 |
| ascorbic acid | 2 |
| water | to make 1 kg |

The obtained caviar imitates, with respect to its colour, granule shape, and taste, natural caviar of sturgeon. The granules can stand the temperature of 45° C. for 45–50 minutes.

EXAMPLE 34

Food caviar imitating natural caviar of sturgeon is prepared by a procedure similar to that described in Example 33, except that after treatment of the granules with the solution of vegetable tannins, they are first treated with an aqueous solution of ferric lactate, and then with an aqueous solution of calcium acetate.

EXAMPLE 35

Food caviar imitating natural caviar of sturgeon is prepared by a procedure similar to that described in Example 33, except that a 0.2–0.5 percent aqueous solution of low-ester pectin (ester value 50 percent), having the pH 4.5–5.5, is used instead of the aqueous solution of sodium alginate.

EXAMPLE 36

Prepare 100 kg of a 10 percent aqueous solution of food gelatin containing edible casein and edible vegetable oils (corn and cotton-seed oil). To do so, a stable emulsion is first prepared on the basis of casein and edible vegetable oils as described in Example 9. Then 10 kg of gelatin, in the form of a 20–30 percent aqueous solution, are added to the emulsion.

The prepared 10 percent aqueous solution of food gelatin containing casein and vegetable oils is passed through a filter cloth at a temperature of 50°–60° C. and is introduced, in the form of droplets, at the same temperature, in to a mixture consisting of equal parts of corn and cotton-seed oils. The lower layers of the oil mixture are cooled to a temperature of 4°–7° C. In these conditions the droplets form regular spheres of 2–4 mm in diameter, and as they are cooled in the lower layers of the oil, gelatin solution turns into jell.

The shaped granules of gelatin jell containing casein and edible vegetable oils are washed with water to remove oil at a temperature of 4°–15° C. with stirring for five minutes. The granules are then treated with an aqueous solution of vegetable tannins that is prepared by boiling 20–30 kg of crushed coarse tea leaves for an hour and cooled before use to a temperature of 4°–10° C. The granules are treated with the tanning solution at a temperature of 4°–15° C. with stirring for 15–25 minutes. As a result of this treatment, a dense, slightly yellowish pellicle consisting of the products of gelatin jell tanning with vegetable tannins, is formed on the granules.

On the termination of the tanning process, the caviar granules are washed with water to remove unreacted tannins at a temperature of 4°–8° C. with stirring for 3–5 minutes. The granules are then treated with a 0.1 percent aqueous solution of sodium alginate having the pH 4.5–5.5. The treatment is carried out at a temperature of 4°–10° C. with stirring for 15 minutes. The caviar granules are then washed for three minutes with water at a temperature of 4°–10° C. and treated with a 0.1 percent aqueous solution of ferric chloride having the pH 4–5 at a temperature of 4°–10° C. with stirring for 3–5 minutes. As a result of this treatment the granule pellicle consisting of the products of gelatin jell tanning with vegetable tannins, is coloured greyish-black owing to the formation of complex salts of tervalent iron and vegetable tannins. At the same time, the second, outer pellicle consisting of ferric alginate, is formed on the granule surface. In order to increase the strength of the second pellicle, the granules are treated with a 0.1 percent aqueous solution of calcium alginate having the pH 4–5. The treatment is carried out at a temperature of 4°–10° C. with stirring for five minutes. As a result of this treatment, calcium alginate is formed that becomes the component of the second, outer pellicle.

Caviar granules coated in two pellicles are washed with a 4–6 percent aqueous solution of sodium chloride at a temperature of 4°–15° C. for 15 minutes (salt curing), and flavouring substances; antiseptics and corn oil are added to caviar as described in Example 33.

EXAMPLE 37

Food caviar imitating natural caviar of sturgeon is prepared by a procedure similar to that described in Example 36, except that after treatment with the aqueous solution of sodium alginate, and washing with water, the caviar granules, instead of being subsequently treated with an aqueous solution of ferric chloride and calcium acetate, are treated with an aqueous solution containing 0.1 percent by weight of ferric chloride, 0.7 percent by weight of calcium chloride and 0.03 percent by weight of aluminium chloride having the pH 3.8–4.2.

EXAMPLE 38

Food caviar with granules coated in two pellicles, imitating natural caviar of sturgeon, is prepared by a procedure similar to that described in Example 29, except that the culinary treatment is carried out as described in Example 17.

EXAMPLE 39

Food caviar with granules coated in two pellicles and imitating natural caviar of sturgeon is prepared by a procedure similar to that described in Example 25, except that instead of being treated with the aqueous solution of calcium acetate, the caviar granules are treated with a 0.2 percent aqueous solution of aluminium-potassium sulphate or aliminium-ammonium sulphate, having the pH 3.8–4.2.

As a result of this treatment, the caviar granules are coated into another pellicle formed by pectinates of aluminium and of tervalent iron.

EXAMPLE 40

Food caviar with granules coated in two pellicles and imitating natural caviar of sturgeon, is prepared by a procedure similar to that described in Example 5, except that after subsequent treatment with the aqueous solution of calcium chloride and the aqueous solution of a mixture of sodium alginate and low-ester pectin, the caviar granules are treated with a 0.1–0.2 percent aqueous solution of ferric chloride having the pH 4–5. The treatment is carried out at a temperature of 4°–15° C.

with stirring for 2–5 minutes. As a result of this treatment the pellicle consisting of the products of gelatin jell tanning with vegetable tannins is coloured greyish-black.

This prepared caviar is given a culinary treatment as in Example 17.

The product imitates natural caviar of sturgeon with respect to its taste, colour and consistency. The granules can stand the temperature of 45° C. for thirty minutes.

EXAMPLE 41

Food caviar with granules coated in two pellicles and imitating natural caviar of sturgeon is prepared by a procedure similar to that described in Example 40 except that the treatment of caviar granules with the aqueous solution of ferric chloride precedes the treatment of the granules with the aqueous solution of sodium alginate and low-ester pectin. The reversal of the sequence of operations as compared with Example 40 results in the change in the quality of the finished product.

EXAMPLE 42

Food caviar with granules coated in two pellicles imitating natural caviar of sturgeon is prepared by a procedure similar to that described in Example 1, except that after the treatment with the aqueous solution of sodium alginate and aqueous solution of calcium acetate, the granules are treated with a 0.1–0.2 percent aqueous solution of ferric chloride having the pH 4–5. The treatment is carried out at a temperature of 4°–15° C. with stirring for 2–5 minutes. As a result of this treatment the pellicles consisting of the products of treatment of gelatin jell with vegetable tannins is coloured greyish-black.

The prepared caviar is given a culinary treatment as in Example 17.

The product imitates natural caviar of sturgeon with respect to its taste, colour and consistency. The granules can stand the temperature of 35° C. for an hour.

EXAMPLE 43

Prepare 100 kg of a 7 percent aqueous solution of food gelatin containing casein, corn oil and cod-liver oil, and coloured greyish-black.

To do so, prepare a greyish-black stable emulsion of corn oil and cod-liver oil in casein solution. The procedure consists in the following 5 kg of crushed coarse tea leaves are boiled in 50 liters of water for an hour to prepare 50 kg of tannin solution. The solution is cooled to room temperature and dissolved in it 0.2 kg of sodium hydroxide and 0.12 kg of ferric chloride. The resultant solution is black and has the pH 12. The black colour is due to the formation of complex salts of tervalent iron and vegetable tannins. Now 7.5 kg of food casein are dissolved in the coloured alkaline solution at a temperature of 50°–60° C. with stirring for two hours. The prepared 13 percent casein solution, coloured black, has the pH 6.2. It is cooled to room temperature and 7.7 kg of a 0.5 percent aqueous solution of sodium alginate are added to it. Prepared simultaneously is an emulsion of 1 kg of a 1 percent aqueous solution of calcium acetate in a mixture of 6 kg of corn oil and 3 kg of cod-liver oil. The obtained emulsion is introduced in the form of a thin jet, in the emulsifying conditions, into the black aqueous solution of casein an sodium alginate. In the process of emulsification, a protective layer of calcium alginate jell is formed on the surface of droplets of the oil phase (a mixture of corn oil and cod-liver oil); the layer prevents coalescence of droplets and delamination of the emulsion.

To the obtained emulsion added are 7 kg of food gelatin in the form of a 30 percent aqueous solution, and the further procedure is the same as in Example 1.

The resultant product weighs 125 kg. It consists of granules coated in two pellicles that can stand the temperature of 35° C. for an hour. The aqueous jell of food gelatin containing casein, corn oil and cod-liver oil, is coloured greyish-black. The granule does not delaminate when stored in a refrigerator for 15 days at a temperature of 4°–8° C.

The obtained product consists of the following components, in grams per kg of caviar;

| food gelatin | 55 |
| casein | 70 |
| corn oil | 50 |
| vegetable tannins | 3–5 |
| calcium alginate | 1.5–2 |
| complex salts of tervalent iron and vegetable tannins | 0.001–0.005 |
| water | to make 1 kg |

EXAMPLE 44

Prepare 100 kg of greyish-black 5 percent aqueous solution of food gelatin containing casein. To do so, boil 3.2 kg of green tea in 64 liters of water for 90 minutes to prepare 64 kg of tannin solution. Cool the obtained solution to room temperature and dissolve in it 0.26 kg of sodium hydroxide and 0.32 kg of ferric lactate. The resultant solution is greyish-black with a brownish tint. Its pH is 12. The greyish-black colour is due to the formation of complex salts of tervalent iron and vegetable tannins. Now dissolve 11 kg of casein in the obtained solution at a temperature of 50°–60° C. with stirring for two hours. The obtained casein solution has the pH 6.2. Cool it to room temperature and add 5 kg of food gelatin in the form of a 20 percent aqueous solution and prepare caviar granules by a procedure described in Example 1.

Give the obtained granules coated in two pellicles the culinary treatment as instructed in Example 26.

The obtained caviar contains the following components, in grams per kg of product:

| food gelatin | 40–45 |
| casein | 90–100 |
| vegetable tannins | 4–5 |
| calcium alginate | 12 1–1.5 |
| complex salts of tervalent iron and vegetable tannins | 0.005–0.01 |
| sodium chloride | 40 |
| herring juice | 15 |
| sodium glutamate | 2 |
| sodium inosinate | 0.5 |
| corn oil | 40 |
| cotton-seed oil | 40 |
| cod-liver oil | 10 |
| dry milk | 30 |
| hydrolyzate of soya-bean proteins | 20 |
| sorbic acid | 1 |
| ascorbic acid | 1 |
| water | to make 1 kg |

The finished product imitates natural caviar of sturgeon with respect to its taste. The aqueous jell of food gelatin inside the granules is coloured greyish-black.

EXAMPLE 45

The starting solution of food gelatin, containing casein and coloured greyish-black, is prepared by a procedure similar to that described in Example 44. The obtained solution is passed through a filter cloth and introduced into a mixture of equal parts of corn oil and cotton-seed oil at a temperature of 60° C. in the form of droplets. The temperature of the upper parts of the oil is 40° C. while in the lower layers the temperature is 3°–10° C. In these conditions the droplets of the starting solution form regular spheres of 2–4 mm in diameter that quickly, without coalescing, pass the upper layer of the oil mixture the viscosity of which is reduced due to elevated temperature, and enter the lower, cold layers of the oil where the gelatin solution turns into jell.

The shaped greyish-black granules of the gelatin jell are washed with water at a temperature of 4°–10° C. for five minutes. The granules are then treated with an aqueous solution of vegetable tannins that is prepared by boiling 15–20 kg of green tea in 300 liters of water for 90 minutes and cooled before use to 4°–8° C. The granules are treated with said aqueous solution of tannins at a temperature of 4°–8° C. with stirring for 20–25 minutes. As a result of this treatment, a dense, slightly yellowish pellicle, consisting of the products of gelatin jell tanning with vegetable tannins, is formed on the granule surface.

Upon termination of the tanning process, the caviar granules are washed with water to remove unreacted vegetable tannins at a temperature of 4°–10° C. for 3–5 minutes. The granules are treated with a 0.2 percent aqueous solution of ferric lactate at a temperature of 4°–10° C. and stirring for 3–5 minutes. As a result of the formation of complex salts of tervalent iron and vegetable tannins, the pellicle, consisting of the products of gelatin jell tanning with vegetable tannins, is coloured greyish-black. The coloured granules are washed with water at a temperature of 4°–10° C. for three minutes and treated with an 1 percent aqueous solution calcium acetate having the pH 4–5 at a temperature of 4°–10° C. with stirring for five minutes. The granules are washed with water at a temperature of 4°–10° C. and treated with a 0.1 percent aqueous solution of sodium alginate having the pH 4.5–5.5 at a temperature of 4°–10° C. with stirring for 15 minutes. As a result of this treatment, the second, thermally stable pellicle consisting of calcium alginate and ferric alginate is formed on the surface of granules. The caviar granules coated in two pellicles are washed with water at a temperature of 4°–10° C. for three minutes.

The finished product, food caviar, is coloured greyish-black both on the surface of its granules and inside them. The granules are stable to temperature of 40° C. for 45 minutes.

EXAMPLE 46

Prepare 100 kg of an 8 percent aqueous solution of food gelatin containing edible casein and coloured red-orange. To that end act as follows. Dissolve 15 kg of casein in a 0.1 N solution of sodium hydroxide at a temperature of 50°–60° C. and stir for 90–120 minutes. Add 15 g of the edible dye bixin (Hoffman-La-Roche, France) in the form of a suspension in a 0.1 N aqueous solution of sodium hydroxide to the obtained casein solution. Stir the obtained mixture and add 8 kg of food gelatin in the form of a 20–30 percent aqueous solution. Continue stirring for another 30–60 minutes at a temperature of 50°–60° C.

Introduce the obtained solution in the form of droplets into corn oil the temperature of which in the lower layers is below the temperature at which the droplets of the solution congeal: 4°–7° C. In these conditions the droplets of the starting solution from regular spheres of 2–4 mm in diameter. As the droplets are cooled in the lower layers of corn oil, the gelatin solution is converted into jell.

The shaped orange red granules of gelatin jell containing casein and the edible dye bixin, are washed with water to remove corn oil. The washing is done with water at a temperature of 4°–15° C. with stirring for 3–5 minutes. The granules are then separated from water and treated with an aqueous solution of vegetable tannins that is prepared by boiling 15–20 kg of tea dust (wastes of tea resulting it cutting tea leaves, their weighing and packaging) in 300–400 liters of water for 60 minutes and cooled to 4°–8° C. before use. The granules are treated with this solution at a temperature of 4°–8° C. with stirring for 15–25 min. As a result of this operation a dense, slightly yellowish pellicles consisting of the products of gelatin jell tanning with vegetable tannins is formed on the surface of the granules.

Upon termination of the tanning process, caviar granules are washed with water at a temperature of 7°–15° C. for 5–7 minutes to remove unreacted tannins. The washed granules are treated with a 0.1 percent aqueous solution of sodium alginate (or a 0.2 percent aqueous solution of low-ester pectins) having the pH 4–6, at a temperature of 4°–15° C. for 15 minutes. The granules are then separated from the solution of sodium alginate and treated for 2–5 minutes with a 0.3–0.8 percent aqueous solution of calcium acetate having the pH 4–5 at a temperature of 4°–15° C. As a result of this treatment, the second, outer pellicle consisting of calcium alginate is formed on the granules to give them high thermal stability. The caviar granules are washed with water at a temperature of 4°–15° C. for 2–3 minutes. The yield of the finished product is 115 kg.

The obtained caviar contains the following components, in grams per kg of product:

| | |
|---|---|
| food gelatin | 70 |
| casein | 130 |
| vegetable tannins | 4–5 |
| calcium alginate | 0.5–1 |
| bixin | 0.14 |
| water | to make 1 kg |

The finished product imitates natural caviar of salmon with respect to its colour and granule shape. The granules can stand the temperature of 35° C. for an hour.

EXAMPLE 47

Food caviar prepared by a procedure similar to that described in Example 46 is given a culinary treatment. To that end the caviar granules are mixed with 4–5 percent by weight of sodium chloride, 0.2 percent by weight of soium sodium glutamate, 0.15 percent by weight portions of sorbic and ascorbic acids, 10 percent by weight of corn oil, into which 1–2 percent by weight of dispersed salmon caviar has been added to give the product the specific odour and taste. The resultant product weighs 130–135 kg and contains the following components, in grams per kg of caviar:

| | |
|---|---|
| food gelatin | 61–62 |
| casein | 115 |
| vegetable tannins | 4–5 |
| calcium alginate | 0.5–1 |
| bixin | 0.12 |
| sodium chloride | 40–50 |
| sodium glutamate | 2 |
| caviar of salmon | 10–20 |
| corn oil | 100 |
| sorbic acid | 1.5 |
| ascorbic acid | 1.5 |
| water | to make 1 kg |

The finished product imitates natural caviar of salmon with respect to its colour, taste and odour. The granules can stand the temperature of 35° C. for an hour.

EXAMPLE 48

Prepare 100 kg of a 4 percent aqueous solution of food gelatin, containing casein and coloured orange-red, as follows. Dissolve 15 kg of casein in a 0.1 N solution of sodium hydroxide at a temperature of 50°–60° C. with stirring for 90–120 minutes. Add 3 g of the edible dye bixin (Hoffman-La-Roche, France) in the form of a 0.05 percent solution in corn oil to the obtained casein solution. Stir the obtained mixture thoroughly and add 5 kg of food gelatin in the form of a 20–30 percent aqueous solution. Stirring is continued for 15 minutes at a temperature of 50°–60° C. The further procedure is the same as in Example 46. The yield of the product 100 kg.

EXAMPLE 49

Food caviar with granules coated in two pellicles, imitating natural caviar of salmon, with respect to its colour and granule shape is prepared by a procedure similar to that described in Example 46, except that 22.5 g of edible orange-red caramel dye are used instead of 15 g of the edible dye bixin. The yield of the product is 113 kg.

EXAMPLE 50

Food caviar prepared in Example 49 is given a treatment in order to impart it the organoleptic properties inherent in natural caviar of salmon, and also to preserve from bacterial contamination. The culinary treatment consists in the following:

Caviar granules coated in two pellicles are kept for five minutes at a temperature of 5°–10° C. in a 5 percent solution of sodium chloride and then added are 0.2 percent by weight of sodium glutamate, 0.15 percent by weight portions of sorbic and ascorbic acids, and 10 percent by weight of corn oil into which 1–2 percent by weight of dispersed natural salmon caviar are added to give it the specific taste and odour.

The finished product imitates natural caviar of salmon with respect to its taste, odour, and colour. The granules can stand the temperature of 45° C. for 40 minutes.

EXAMPLE 51

Food caviar imitating natural caviar of salmon is prepared by a procedure similar to that described in Example 1, except that the granules coated in the pellicle consisting of the products of gelatin jell tanned with vegetable tannins are washed with water and then treated with a 0.1 percent solution of the edible dye bixin, having the pH 5–7 for 5–10 minutes at a temperature of 7°–15° C. As a result of this treatment said pellicle is coloured orange-red that imitates the colour of natural caviar of salmon. After colouring, the caviar granules are washed with water for 5–7 minutes at a temperature of 7°–15° C. The finished product contains the dye bixin in the quantity of 0.0015 g per kg of caviar.

EXAMPLE 52

Food caviar prepared as described in Example 51 is given a culinary treatment as described in Example 47. The resultant product imitates natural caviar of salmon with respect to its taste, odour, and colour. The finished product contains the edible dye bixin in the quantity of 0.001 g per kg of caviar. The granules can stand the temperature of 40° C. for 45 minutes.

EXAMPLE 53

Food caviar imitating natural caviar of salmon is prepared by a procedure similar to that described in Example 1, except that immediately after the tanning operation (without washing with water, the granules coated in the pellicle consisting of the products of gelatin jell tanned with vegetable tannins, are treated with a 0.1 percent aqueous solution of the edible dye bixin having the pH 7°–15° C. The granules are washed to remove the unreacted tannins in this process and at the same time are coloured orange red to imitate the colour of natural caviar of samlon. After dyeing, the granules are washed with water for 8–7 minutes at a temperature of 7°–15° C.

EXAMPLE 54

Food caviar imitating natural caviar of salmon, is prepared by a procedure similar to that described in Example 4, except that immediately after the operation of tanning (without washing with water), the granules of caviar coated in a pellicle consisting of the products of gelatin jell tanning with vegetable tannins, are treated with a 0.2 percent aqueous solution of red-orange edible dye having the pH 4–6. The treatment is continued for 10–15 minutes at a temperature of 5°–15° C. In this process the caviar granules are washed off the unreacted vegetable tannins and dyed in the colour imitating that of natural caviar of salmon. The granules are then washed with water for 5–7 minutes at a temperature of 5°–15° C. The finished product contains 0.01 g of red-orange caramel dye per kg of the finished product.

EXAMPLE 55

Food caviar prepared in Example 54 is given a culinary treatment as described in Example 50. The resulant product imitates natural caviar of salmon with respect to its taste, odour, and colour. The finished product contains 0.008 g of orange-red caramel dye per kg of the finished caviar. The caviar granules can stand the temperature of 40° C. for an hour.

EXAMPLE 56

Food caviar imitating natural caviar of sturgeon is prepared by a procedure similar to that described in Example 1, except that a 0.15–0.3 percent aqueous solution of ferric chloride, having the pH 3–4 is used instead of the 0.3–0.8 percent aqueous solution of calcium acetate. As a result of the treatment of caviar granules with the solution of ferric chloride, the pellicle on the granules, consisting of the product of gelatin jell tanned with vegetable tannins, is coloured greyish-black due to the formation of complex salts of tervalent iron and vegetable tannins, and the second, outer pellicle, consisting of ferric alginate, is formed on the granules to give them high thermal stability.

The finished product, food caviar, contains the following components, in grams per kg of caviar:

| food gelatin | 60–65 |
|---|---|
| casein | 135–140 |
| vegetable tannins | 2–4 |
| ferric alginate | 0.1–0.5 |
| complex salts of tervalent iron and vegetable tannins | 0.003–0.007 |
| water | to make 1 kg |

Food caviar with granules coated in two pellicles is greyish-black in colour that corresponds to the colour of natural caviar of sturgeon. The granules can stand the temperature that exceeds the point at which gelatin jell melts, namely, 35° C., for an hour.

EXAMPLE 57

Food caviar with granules coated in two pellicles is prepared by a procedure similar to that described in Example 56 except that a 0.2 percent aqueous solution of low-ester pectin (ester value 40 percent), having the pH 4–5, is used instead of the aqueous solution of sodium alginate, and a 0.3–0.5 percent aqueous solution of ferric lactate, having the pH 4–5 is used instead of the aqueous solution of ferric chloride.

As a result of this process the inner pellicle consisting of the products of gelatin jell tanning is coloured greyish-black with a brownish tint, while the outer pellicle of the granules consists of ferric pectinate. The caviar granules can stand the temperature of 45° C. for 40 minutes.

EXAMPLE 58

Food caviar imitating natural caviar of sturgeon is prepared by a procedure similar to that described in Example 5 except that a 0.5 percent aqueous solution of ferric chloride, having the pH 3, is used instead of the 1 percent aqueous solution of calcium chloride.

The yield of the product is 125 kg. The obtained food caviar has its granules coated with the inner pellicles consisting of the products of gelatin jell tanning and is coloured greyish-black to imitate the colour of natural caviar of sturgeon, while the outer pellicles consist of alginate and pectinate of tervalent iron. The finished product contains the following components, in grams per kg of the finished product:

| food gelatin | 80 |
|---|---|
| casein | 95 |
| starch | 40 |
| vegetable tannins | 4–6 |
| a mixture of ferric alginate and pectinate | 0.5–1 |
| complex salts of tervalent iron and vegetable tannins | 0.007–0.01 |
| water | to make 1 kg |

The caviar granules can stand the temperature of 40° C. for 45 minutes.

EXAMPLE 59

Prepared 100 kg of greyish-black 5 percent aqueous solution of food gelatin containing casein as follows. Boil 3.2 kg of green tea in 64 liters of water for 90 minutes to prepare 64 kg of vegetable tannin solution. Cool it to room temperature and dissolve in it 0.26 kg of sodium hydroxide and 0.32 kg of ferric lactate. The resultant solution has greyish-black colour with a brownish tint and has the pH 12. The greyish-black colour is due to the formation of complex salts of tervalent iron and vegetable tannins. Dissolve 11 kg of casein in the coloured alkaline solution at a temperature of 50°–60° C. with stirring for two hours. The obtained solution has the pH 6.2. Cool it to room temperature and add 5 kg of food gelatin in the form of a 20 percent aqueous solution. The further procedure is the same as described in Example 56.

The granules of the finished product, food caviar, have two pellicles of which the inner one is coloured greyish-black, while the outer one is formed by ferric alginate. The aqueous jell of food gelatin inside the granules is also coloured greyish-black. The granules can stand the temperature of 40° C. for 45 minutes.

EXAMPLE 60

Caviar granules coated in two pellicles, coloured both on the inside and the outside, are prepared by a procedure similar to that described in Example 59.

The obtained caviar granules are washed with a 4–6 percent aqueous solution of sodium chloride at a temperature of 4°–15° C. for five minutes and then added are 0.3 percent by weight of sodium glutamate, 0.1 percent by weight portions of sorbic and ascorbic acids, 2.8 percent by weight of hydrolyzate of soya bean proteins, 10 percent by weight of corn oil, and 4 percent by weight of herring flesh finely disintegrated in corn oil. The yield of the finished product is 122 kg.

The obtained caviar contains the following components, in grams per kg of the finished product:

| food gelatin | 40 |
|---|---|
| casein | 125 |
| vegetable tannins | 2–3.5 |
| ferric alginate | 0.1–0.5 |
| complex salts of tervalent iron and vegetable tannins | 0.003–0.007 |
| sodium chloride | 45 |
| sodium glutamate | 3 |
| herring flesh | 4 |
| corn oil | 100 |
| hydrolyzate of soya-bean proteins | 28 |
| sorbic acid | 1 |
| ascorbic acid | 1 |
| water | to make 1 kg |

The finished product imitates natural caviar of sturgeon with respect to its taste and appearance. The granules can stand the temperature of 35°–40° C. for an hour.

EXAMPLE 61

Prepare 100 kg of a 7 percent aqueous solution of gelatin, containing casein, corn oil, and cod-liver oil, and coloured greyish-black, as follows.

First prepare a greyish-black stable emulsion of corn oil and cod-liver oil in casein solution. The procedure consists in the following: boil 5 kg of crushed coarse tea leaves in 50 liters of water for an hour to prepare 50 kg of tannin solution. Cool it to room temperature and dissolve in it 0.2 kg of sodium hydroxide and 0.12 kg of ferric chloride. The resultant solution having the pH 12, is coloured black. The black colour is due to the formation of complex salts of tervalent iron and vegetable tannins. Dissolve in the obtained solution 7.5 kg of edible casein at a temperature of 50°-60° C. with stirring for two hours, and cool the resultant 13 percent casein solution, coloured black and having the pH 6.2, to room temperature. Add to the obtained casein solution 7.7 kg of a 0.5 percent aqueous solution of sodium alginate. Prepare simultaneously an emulsion of 1 kg of a 0.5 percent aqueous solution of ferric chloride in a mixture of 6 kg of corn oil and 3 kg of cod-liver oil. Introduce the obtained emulsion, in the form of a thin jet, in the conditions of emulsification, into the black aqueous solution of casein and sodium alginate. A protective layer of ferric alginate jell is formed as a result on the surface of the oil phase droplets that prevent them from coalescing and delamination of the emulsion.

Now add 7 kg of food gelatin, in the form of a 30 percent aqueous solution, into the obtained emulsion, and proceed as instructed in Example 56.

Caviar granules coated in two pellicles should be then kept for 5–10 minutes at a temperature of 8°-12° C. in a 4.5 percent aqueous solution of sodium chloride to salt the product. Finally add 0.3 percent by weight of sodium glutamate, 0.15 percent by weight portions of sorbic and ascorbic acids, 1 percent by weight of corn oil, 0.004 percent by weight of sodium inosinate, 0.003 percent by weight of maltol and L tryptophan and 0.006 percent by weight of alcoholic solution of flavouring substances, consisting of the following ingredients, in percent by weight:

| trimethylamine | 4.9 |
| triethylamine | 9.5 |
| pyridine | 1.9 |
| piperidine | 4.8 |
| n-propylamine | 4.8 |
| undecanone-2 | 1.9 |
| diacetal of n-valeric aldehyde | 4.8 |
| ethyl alcohol | 67.4 |

The finished product imitates natural caviar of sturgeon with respect to its taste, and the appearance. The granules are coloured greyish-black both on the outside and on the inside. The granules can stand the temperature of 40° C. for 45 minutes. The granule contents are not delaminated on standing in a refrigerator at a temperature of 4°-8° C. for 15 days.

EXAMPLE 62

Food caviar (uncoloured, with granules coated in two pellicles) is prepared as described in Example 1, except that a 0.2–0.6 percent aqueous solution of zinc chloride, having the pH 3.5, is used instead of the 0.3–0.8 percent aqueous solution of calcium acetate.

The obtained food caviar can stand the temperature exceeding the point at which gelatin jell melt, namely the temperature of 40° C., for 45 minutes.

EXAMPLE 63

Food caviar (uncoloured, with granules coated in two pellicles) is prepared by a procedure similar to that described in Example 5, except that a 1 percent aqueous solution of manganous chloride, having the pH 4–7, is used instead of the 1 percent aqueous solution of calcium chloride.

The obtained food caviar can stand the temperature of 40° C. for 40 minutes.

EXAMPLE 64

Food caviar with granules coated in two pellicles is prepared by a procedure similar to that described in Examples 1 and 2, except that a mixture of aqueous solutions of calcium acetate (0.2–0.6 percent) and ferrous sulphate (0.2–0.4 percent), having the pH 4–5, is used instead of the 0.3–0.8 percent aqueous solution of calcium acetate.

The properties of the finished product are the same as described in Example 1, 2 and 3.

EXAMPLE 65

Food caviar imitating natural caviar of sturgeon, is prepared by a procedure similar to that described in Example 29, except that the caviar granules washed off the unreacted tannins is treated for 3–5 minutes at a temperature of 4°-10° C. with stirring with a 0.1 percent aqueous solution of ferric chloride containing 0.3 percent calcium chloride, and 0.2 percent of cupric chloride having the pH 4.

The finished product imitates natural caviar of sturgeon with respect to its taste and appearance. The granules can stand the temperature of 35°-40° C. for an hour.

EXAMPLE 66

Food caviar imitating natural caviar of sturgeon is prepared by a procedure similar to that described in Example 29, except that caviar granules are washed off the unreacted tannins and then treated for 3–5 minutes, at a temperature of 4°-10° C., with stirring, with a 0.1 percent aqueous solution of ferric chloride containing 0.5 percent calcium chloride and 0.05 percent of chromium trichloride, and having the pH 4.

The finished product imitates natural caviar of sturgeon with respect to its taste and the appearance. The granules can stand the temperature of 40° C. for 90 minutes.

EXAMPLE 67

Food caviar imitating natural caviar of sturgeon is prepared by a procedure similar to that described in Example 29 except that the granules washed off the unreacted tannins are treated for 5–10 minutes with stirring at a temperature of 4°-10° C., with a 0.5 percent aqueous solution of ferric chloride containing 0.5 percent of magnesium chloride and having the pH 3–4.

The finished product imitates natural caviar of sturgeon with respect to its taste and appearance. Its granules can stand the temperature of 35° C. for 90 minutes.

What we claim is:

1. A synthetic, granular food caviar, the granules of which have a center of an aqueous jell of food gelatin containing additional edible protein surrounded by two coatings: the inner coating consisting essentially of the reaction product of said jell and vegetable tannins, and the outer coating being the reaction product of at least one edible polyvalent metal salt and acid polysaccharide.

2. A synthetic, granular food caviar according to claim 1, wherein the metal salts are selected from the group consisting of calcium, aluminum, iron, divalent copper, tervalent chromium, zinc, divalent manganese.

3. A synthetic, granular food caviar according to claim 1, wherein the outer coating contains salts of edible polyvalent metals and water-soluble alginate, as the reaction product of the edible polyvalent metal salts and acid polysaccharides.

4. A synthetic, granular food caviar according to claim 1, containing salts of edible polyvalent metals and low-ester pectins, having the ester value of maximum 50 percent, as the reaction product of edible polyvalent metal salts and acid polysaccharides.

5. A synthetic, granular food caviar according to claim 1, in which the components are contained in the following quantities, in grams per kg of caviar:

| | |
|---|---|
| food gelatin | 40–80 |
| edible proteins | 35–140 |
| vegetable tannins | 2–6 |
| edible polyvalent metal salts of acid polysaccharides as defined in claim 46 | 0.1–2 |
| water | to make 1 kg |

6. A synthetic, granular food caviar according to claim 1, wherein the inner coating also contains complex salts of tervalent iron and vegetable tannins in the quantity of 0.001–0.01 g per kg of caviar.

7. A synthetic, granular food caviar according to claim 1, wherein the inner coating also contains edible orange-red dyes in the quantity of 0.001 to 0.01 g per kg of caviar, while the outer coating contains the reaction product of at least one edible polyvalent metal salt and acid polysaccharide, with the proviso that it does not contain the salts of tervalent iron and acid polysaccharide.

8. A synthetic, granular food caviar according to claim 1, in which the aqueous jell of food gelatin also contains the following components taken either separately or in various combinations (in grams per kg. of caviar):

| | |
|---|---|
| lipids | 3–70 |
| carbohydrates | 3–40 |
| vitamins | 0.001–0.002 |

9. A synthetic, granular food caviar the granules of which have a center of an aqueous jell of food gelatin containing additional edible proteins and complex salts of tervalent iron and vegetable tannins in two surrounding coatings: the inner coating consisting essentially of the reaction product of said jell and vegetable tannins, and the outer coating, being the reaction product of at least one edible polyvalent metal salt and acid polysaccharide.

10. A synthetic, granular food caviar according to claim 9, containing the following components, in grams per kg of caviar:

| | |
|---|---|
| food gelatin | 40–80 |
| edible proteins | 35–140 |
| vegetable tannins | 2–6 |
| edible polyvalent metal salts of acid polysaccharides | 0.1–2 |
| complex salts of tervalent iron and vegetable tannins | 0.001–0.01 |
| water | to make 1 kg |

11. A synthetic, granular food caviar the granules of which have a center of an aqueous jell of food gelatin containing additional edible proteins and red-orange edible dyes; said jell surrounded by two coatings: the inner coating consisting essentially of the reaction product of said jell and vegetable tannins, and the outer coating being the reaction product of at least one edible polyvalent metal salt and acid polysaccharide, with the proviso that it does not contain the tervalent iron salt of acid polysaccharide.

12. A synthetic, granular food cavier according to claim 11, containing the components in the following quantities, in grams per kg of caviar:

| | |
|---|---|
| food gelatin | 40–80 |
| edible proteins | 35–140 |
| vegetable tannins | 2–6 |
| edible polyvalent metal salts of acid polysaccharides | 0.1–2 |
| edible orange-red dyes | 0.03–0.2 |
| water | to make 1 kg |

13. A synthetic, granular food caviar the granules of which have a center of an aqueous jell of gelatin containing edible additional proteins surrounded by two coatings: the inner coating consisting essentially of the reaction product of said jell and vegetable tannins, and the outer coating being the product of at least one edible polyvalent metal salt and acid polysaccharide; said food caviar also containing vegetable oil, sodium chloride, and edible flavoring substances.

14. A synthetic, granular food caviar according to claim 13, containing the following components, in grams per kg of caviar:

| | |
|---|---|
| food gelatin | 40–80 |
| edible proteins | 35–140 |
| vegetable tannins | 2–6 |
| edible polyvalent metal salts of acid polysaccharides | 0.1–2 |
| vegetable oil | 10–100 |
| sodium chloride | 30–50 |
| edible flavoring substances | 3–30 |
| water | to make 1 kg |

15. A synthetic, granular food caviar according to claim 14, in which the inner coating, consisting essentially of the reaction product of said jell and vegetable tannins, also contains complex salts of a tervalent metal and vegetable tannins, in the quantity of 0.001–0.01 g per kg of caviar.

16. A synthetic, granular food caviar according to claim 14, in which the inner coating, consisting essentially of the reaction product of said jell and vegetable tannins, also contains organge-red edible dyes in the quantity of 0.001–0.01 g per kg of caviar, and the outer coating contains the reaction product of at least one edible polyvalent metal salt and acid polysaccharide, with the proviso that it does not contain the tervalent iron salt of acid polysaccharide.

17. A synthetic, granular food caviar according to claim 14, in which the granular food caviar also contains substances selected from the group consisting of lipids and edible proteins, taken in the quantity of 20–120 g per kg of caviar.

18. A synthetic, granular food caviar according to claim 14, in which the granular food caviar also contains substances selected from the group consisting of essential amino acids, vitamins, and antiseptics, in the quantity of 3–30 g per kg of caviar.

19. A synthetic, granular food caviar the granules of which have a center of an aqueous jell of food gelatin containing additional edible proteins and complex salts of tervalent iron and vegetable tannins; said jell surrounded by two coatings: the inner coating consisting essentially of the reaction product of said jell and vegetable tannins, and the outer coating being the reaction product of at least one edible polyvalent metal salt and acid polysaccharide; the granular food caviar also containing vegetable oil, sodium chloride, and edible flavoring substances.

20. A synthetic, granular food caviar according to claim 19, in which the components are contained in the following quantities, in grams per kg of caviar:

| | |
|---|---|
| food gelatin | 40-80 |
| edible proteins | 35-140 |
| vegetable tannins | 2-6 |
| edible polyvalent metal salts of acid polysaccharides | 0.1-2 |
| complex salts of tervalent iron and vegetable tannins | 0.001-0.01 |
| vegetable oil | 10-100 |
| sodium chloride | 30-50 |
| edible flavoring substances | 3-30 |
| water | to make 1 kg |

21. A synthetic, granular food caviar according to claim 20, in which said granular food caviar also contains substances selected from the group consisting of essential amino acids, vitamins, and antiseptics, taken in the quantity from 3 to 30 g per kg of caviar.

22. A synthetic, granular food caviar according to claim 20, in which said granular food caviar also contains substances selected from the group consisting of lipids and edible proteins, taken in the quantity of 20-120 g per kg of caviar.

23. A synthetic, granular food caviar the granules of which have a center of an aqueous jell of food gelatin containing additional edible proteins and orange-red edible dyes surrounded by two coatings: the inner coating consisting essentially of said jell vegetable tannins, and the outer coating being the reaction product of at least one edible polyvalent metal salt and acid polysaccharide, with the proviso that it does not contain the tervalent iron salt of acid polysaccharide; the granular food caviar also containing vegetable oil, sodium chloride, and edible flavoring substances.

24. A synthetic, granular food caviar according to claim 23, containing in the following quantities, in grams per kg of caviar:

| | |
|---|---|
| food gelatin | 40-80 |
| edible proteins | 35-140 |
| vegetable tannins | 2-6 |
| edible polyvalent metal salts of acid polysaccharides | 0.1-2 |
| edible orange-red dyes | 0.03-0.2 |
| vegetable oil | 10-100 |
| sodium chloride | 30-50 |
| edible flavoring substances | 3-30 |
| water | to make 1 kg. |

25. A synthetic, granular food caviar according to claim 24, in which the granular food caviar also contains substances selected from the group consisting of lipids and edible proteins, taken in the quantity of 20-120 g per kg of caviar.

26. A synthetic, granular food caviar according to claim 24, in which the granular food caviar also contains substances selected from the group consisting of essential amino acids, vitamins, and antiseptics, taken in the quantity of 3-30 g per kg of caviar.

27. A method for preparing a synthetic, granular edible caviar which comprises preparing a 4-10 percent aqueous solution of food gelatin containing additional food proteins; introducing said solution in the form of droplets into an edible oil the temperature of which, at least in its lower layers, is below the temperature at which the droplets of said solution congeal; the thus formed granules are washed with water to remove the edible oil, the granules are then treated with aqueous solutions of vegetable tannins; then washing the granules with water to remove the excess vegetable tannins; treating the washed granules with aqueous solutions of acid polysaccharides and aqueous solutions of at least one edible polyvalent metal salt.

28. A method according to claim 27, wherein the metal salts are selected from the group consisting of calcium, aluminum, iron, divalent copper, tervalent chromium, zinc and divalent manganese, are used as the salts of edible polyvalent metals of edible acids, the aqueous solution of these salts of edible polyvalent metals and edible acids having the concentration of 0.1-1 percent and a pH from 3 to 7.

29. A method according to claim 27, wherein alginates in the form of their aqueous solutions are used as acid polysaccharides at a concentration of 0.1-0.5 percent and a pH from 3 to 7.

30. A method according to claim 27, wherein aqueous solutions of low-ester pectins, having the ester value maximum 50 percent, at a concentration of 0.1-0.5 percent and a pH from 3 to 7, are used as acid polysaccharides.

31. A method according to claim 27, which comprises preparing a 4-10 percent aqueous solution of food gelatin containing edible proteins and additionally containing substances selected from the group consisting of lipids, carbohydrates, and vitamins.

32. A method of preparing a synthetic, granular food caviar which comprises preparing a 4-10 percent aqueous solution of food gelatin containing additional edible proteins; introducing said solution, in the form of droplets, into an edible oil the temperature of which at least in its lower layers is below the temperature at which the droplets of the solution congeal; washing the resulting granules of gelatin jell containing additional edible proteins with water to remove the oil, and treating said granules with an aqueous solution of vegetable tannins; further treating the thus-obtained granules of caviar with aqueous solution of red-orange edible dyes; and then treating the granules with aqueous solutions of acid polysaccharides and aqueous solutions of at least one edible polyvalent metal salt of edible acids, except those of aqueous solutions of ferric salts.

33. A method according to claim 32, in which, before being treated with aqueous solutions of edible dyes, the granules of caviar are washed with water.

34. A method of preparing a synthetic, granular food caviar which comprises preparing a 4-10 percent aqueous solution of food gelatin containing edible proteins, and also edible dyes, which are tervalent iron salts of edible acids, and vegetable tannins; introducing said solution, in the form of droplets, into an edible oil the temperature of which, at least in its lower layers, is below the temperature at which the droplets of the solution congeal; washing the resulting granules with water to remove the edible oil, and then treating said granules with aqueous solutions of vegetable tannins; and then washing the granules with water to remove the excess vegetable tannins; treating the washed granules with aqueous solutions of acid polysaccharides and aqueous solutions of at least one edible polyvalent metal salt of edible acids.

35. A method of preparing a synthetic, granular food caviar which comprises preparing a 4–10 percent aqueous solution of food gelatin containing additional edible proteins, and also orange-red edible dyes; introducing said solution, in the form of droplets, into an edible oil the temperature of which, at least in its lower layers, is below the temperature at which the droplets of said solution congeal; washing the thus-formed granules with water to remove the edible oil, and then treating the granules with aqueous solutions of vegetable tannins; washing the resulting granules of caviar with water to remove the excess vegetable tannins; and treating the washed granules with aqueous solutions of acid polysaccharides and aqueous solutions of salts of at least one edible polyvalent metal and of edible acids.

36. A method of preparing a synthetic, granular food caviar which comprises preparing a 4–10 percent aqueous solution of food gelatin containing additional edible proteins, and also orange-red edible dyes; introducing said solution, in the form of droplets, into an edible oil the temperature of which, at least in its lower layers, is below the temperature at which the droplets of said solution congeal; washing the thus-formed granules with water to remove the edible oil, and then treating the granules with aqueous solutions of vegetable tannins; washing the resulting granules of caviar with water to remove the excess vegetable tannins; and treating the granules with aqueous solutions of acid polysaccharides and aqueous solutions of at least one polyvalent metal salt of edible acids, except with aqueous solutions of ferric salts.

37. A method of preparing a synthetic, granular edible food caviar, which comprises preparing a 4–10 percent aqueous solution of food gelatin containing additional edible proteins, introducing said solution in the form of droplets into an edible oil the temperature of which, at least in its lower layers, is below the temperature at which the droplets of said solution congeal; washing the thus-formed granules of gelatin jell containing additional edible proteins with water to remove the excess edible oil and then treating the granules with aqueous solutions of vegetable tannins; washing the resulting caviar granules with water to remove the excess vegetable tannins; and, treating the washed granules of caviar with aqueous solutions of acid polysaccharides and aqueous solutions of at least one edible polyvalent metal salt of edible acids; next the granules are given a culinary treatment consisting essentially in salting with sodium chloride and adding vegetable oil and edible flavoring substances thereto.

38. A method according to claim 37, which comprises adding to the granules of caviar, at the stage of the culinary treatment, substances selected from the group consisting of lipids, edible proteins, essential amino acids, vitamins, and antiseptics.

39. A method of preparing a synthetic, granular food caviar which comprises preparing a 4–10 percent aqueous solution of food gelatin containing additional edible proteins, introducing said solution in the form of droplets into an edible oil the temperature of which, at least in its lower layers, is below the temperature at which the droplets of said solution congeal; the thus-formed granules of gelatin jell containing additional edible proteins are washed with water to remove the edible oil and then treating the granules with aqueous solutions of vegetable tannins; treating the resulting caviar granules with aqueous solutions of orange-red edible dyes; and treating the granules of caviar with aqueous solutions of acid polysaccharides and aqueous solutions of salts of at least one edible polyvalent metal salt of edible acids, except the aqueous solutions of ferric salts; giving the granules a culinary treatment consisting in salting them with sodium chloride and adding to them vegetable oil, and edible flavoring substances.

40. A method according to claim 39, in which, before treating with aqueous solutions of edible dyes, the caviar granules are washed with water.

41. A method according to claim 39, which comprises adding to the caviar granules, at the stage of the culinary treatment, substances selected from the group consisting of lipids, edible proteins, essential amino acids, vitamins, and antiseptics.

42. A method of preparing a synthetic, granular food caviar which comprises preparing a 4–10 percent aqueous solution of food gelatin containing edible proteins and also edible dyes, which are tervalent iron salts of edible acids and vegetable tannins, introducing said solution in the form of droplets into an edible oil, the temperature of which, at least in its lower layers, is below the temperature at which the droplets of said solution congeal; the resulting granules of gelatin jell containing additional edible proteins and complex salts of tervalent iron and vegetable tannins are washed with water to remove the edible oil, and then treating them with aqueous solutions of vegetable tannins; washing the resulting caviar granules with water to remove said vegetable tannins, and treating the washed caviar granules with aqueous solutions of acid polysaccharides and aqueous solutions of at least one polyvalent edible metal salt of edible acids; and giving the caviar granules a culinary treatment consisting in salting with sodium chloride and adding thereto vegetable oil and edible flavoring substances.

43. A method according to claim 42, which comprises adding to the caviar granules, at the stage of the culinary treatment, substances selected from the group consisting of lipids, edible proteins, essential amino acids, vitamins, and antiseptics.

44. A method of preparing a synthetic, granular food caviar which comprises preparing a 4–10 percent aqueous solution of food gelatin containing additional edible proteins and also orange-red edible dyes, introducing said solution in the form of droplets into an edible oil the temperature of which, at least in its lower layers, is below the temperature at which the droplets of said solution congeal; washing the thus-formed granules of gelatin jell containing additional edible proteins and edible dyes with water to remove the edible oil and then treating them with aqueous solutions of vegetable tannins; washing the resulting caviar granules with water to remove the excess vegetable tannins; and treating the washed caviar granules with aqueous solutions of acid polysaccharides and aqueous solutions of at least one edible polyvalent metal salt of edible acids, except aqueous solutions of ferric salts; and then giving the caviar granules a culinary treatment consisting in salting them with sodium chloride, and adding thereto vegetable oil and edible flavoring substances.

45. A method according to claim 44, which comprises adding to the caviar granules, at the stage of their culinary treatment, substances selected from the group consisting of lipids, edible proteins, essential amino acids, vitamins, and antiseptics.

* * * * *